United States Patent
Cakulev et al.

(10) Patent No.: US 11,323,869 B2
(45) Date of Patent: May 3, 2022

(54) SYSTEMS AND METHODS FOR ENABLING EFFICIENT ESTABLISHMENT OF POLICY CONTROL ASSOCIATIONS

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/925,954

(22) Filed: Jul. 10, 2020

(65) Prior Publication Data
US 2022/0014898 A1    Jan. 13, 2022

(51) Int. Cl.
| | |
|---|---|
| *H04W 8/04* | (2009.01) |
| *H04W 84/04* | (2009.01) |
| *H04W 76/10* | (2018.01) |
| *H04L 12/14* | (2006.01) |
| *H04W 92/24* | (2009.01) |
| *H04W 88/14* | (2009.01) |

(52) U.S. Cl.
CPC ........... *H04W 8/04* (2013.01); *H04L 12/1407* (2013.01); *H04W 76/10* (2018.02); *H04W 84/042* (2013.01); *H04W 88/14* (2013.01); *H04W 92/24* (2013.01)

(58) Field of Classification Search
CPC ..... H04W 8/04; H04W 76/10; H04W 84/042; H04W 88/14; H04W 92/24; H04W 4/70; H04W 28/12; H04W 4/40; H04W 4/90; H04L 12/1407
See application file for complete search history.

(56) References Cited

U.S. PATENT DOCUMENTS

| | | | | |
|---|---|---|---|---|
| 2020/0145876 A1* | 5/2020 | Dao | .................. | H04W 28/0268 |
| 2020/0154350 A1* | 5/2020 | Dao | .................. | H04W 36/0009 |
| 2020/0214054 A1* | 7/2020 | Qiao | ...................... | H04W 48/18 |
| 2020/0260525 A1* | 8/2020 | Gan | ....................... | H04W 12/06 |
| 2020/0358909 A1* | 11/2020 | Ahmadi | ................. | H04W 76/11 |
| 2020/0367141 A1* | 11/2020 | Cakulev | ................ | H04M 15/66 |
| 2020/0367297 A1* | 11/2020 | Dao | ....................... | H04W 8/186 |
| 2021/0212136 A1* | 7/2021 | Lee | .......................... | H04W 4/50 |
| 2021/0251018 A1* | 8/2021 | Afzal | ..................... | H04W 76/10 |
| 2021/0258828 A1* | 8/2021 | Qiao | ...................... | H04W 28/06 |
| 2021/0274436 A1* | 9/2021 | Sun | ...................... | H04L 41/0893 |
| 2021/0314850 A1* | 10/2021 | Cakulev | ................ | H04W 60/04 |
| 2021/0314899 A1* | 10/2021 | Shan | ..................... | H04W 12/06 |
| 2021/0392495 A1* | 12/2021 | Tsiatsis | ................. | H04W 12/30 |

* cited by examiner

*Primary Examiner* — Khawar Iqbal

(57) ABSTRACT

Methods, devices, and computer-readable mediums may provide receiving, at a request to establish an access and mobility (AM) policy control association in relation to an establishment of a packet data unit (PDU) session requested by a subscriber associated with a user equipment (UE) device; generating a query to a network device via a network interface, for AM policy control data and for at least one of UE policy control data or session management (SM) policy control data; receiving the AM policy control data and the at least one of the UE policy control data or the SM policy control data from the network device, creating the AM policy control association based on the received AM policy control data; and storing the at least one of the UE policy control data or the SM policy control data.

20 Claims, 5 Drawing Sheets

SYSTEMS AND METHODS FOR ENABLING EFFICIENT ESTABLISHMENT OF POLICY CONTROL ASSOCIATIONS

BACKGROUND INFORMATION

Wireless communication service providers continue to develop and expand available services and their delivery networks. An enhanced core network deployment enables separation of access management functionality from session management functionality. That is, user equipment (UE) access and mobility policy control function (AM PCF), discrete packet data unit (PDU) session management PCF (SM PCF), and UE access selection and PDU session-related PCF (UE PCF), may be handled independently. Facilitating efficient exchanging of AM policy data, UE policy data, and SM policy data within the core network, poses various challenges.

DETAILED DESCRIPTION OF PREFERRED EMBODIMENTS

The following detailed description refers to the accompanying drawings. The same reference numbers in different drawings identify the same or similar elements.

As communication networks and services increase in size, complexity, and number of users, network management has become increasingly complex. One way in which wireless access networks are becoming more complicated is by incorporating various aspects of next generation networks, such as Fifth Generation (5G) mobile networks, utilizing high frequency bands (e.g., 24 Gigahertz (GHz), 39 GHz, etc.) and/or lower frequency bands (e.g., sub 6 GHz), and considerably more antennas. 5G technology may provide significant improvements in bandwidth and/or latency over previous wireless network technology. Furthermore, coverage and signal quality may be improved using multiple-input and multiple-output (MIMO) adaptive antenna arrays. Additionally, UE devices may also include multiple antennas to improve spectral efficiency.

For a UE device to acquire wireless service of a network, the UE device has to first establish a wireless connection (e.g., a Radio Resource Control (RRC) connection) with a radio access network (RAN), and then authenticate, register, and establish a bearer with a core network. Typically, as part of an attachment procedure with the core network, the UE device receives policies or policy decisions from the core network. For example, the policies may include a UE route selection policy (URSP) for outgoing traffic, a policy for network discovery and selection, a policy pertaining to acceptable service areas and available bandwidth, and/or policies relating to quality of service (QoS) requirements.

In practice, because implementations may differ as to whether UE/AM PCF and SM PCF are the same or not, the same PCF can retain all SM, AM, and UE policy control associations for a subscriber. Further, a Uniform Data Repository (UDR) function and an Nudr interface may enable the combination PCF (i.e., a same PCF handling two or more of the AM, UE, and SM policy control) to obtain policy control-related subscription information and application-specific information stored in the UDR. Implementations described herein relate to policy control associations establishment procedures in which the retrieval from the UDR function of policy control-related subscription information and application-specific information, for AM policy data, UE policy data, and SM policy data, may be accomplished in fewer signaling exchanges via the Nudr interface.

Figure 1:
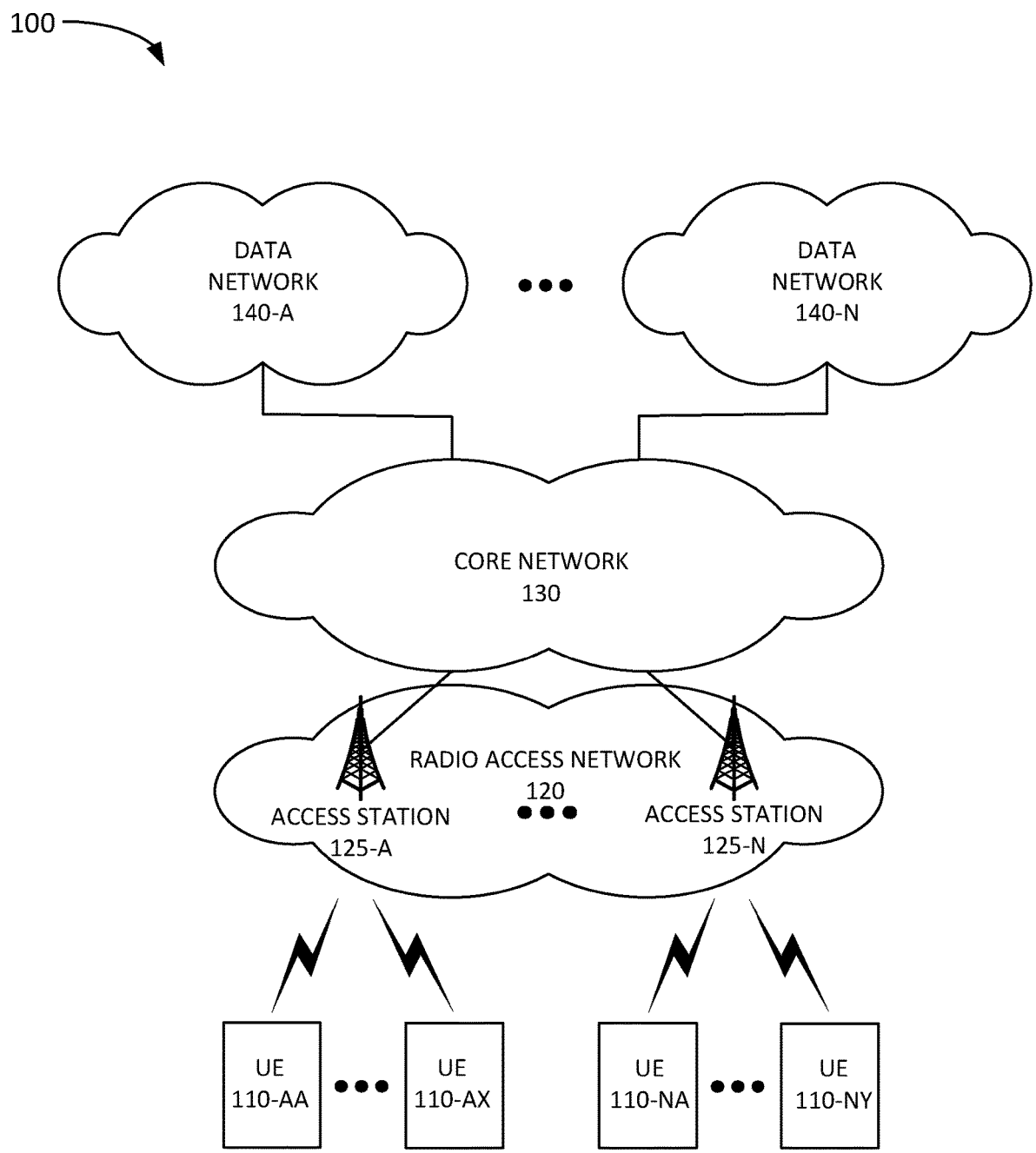
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include UE devices 110-AA to 110-NY (referred to herein collectively as "UE devices 110" and individually as "UE device 110"), a radio access network (RAN) 120, a core network 130, and data networks 140-A to 140-N.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wrist-watch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication.

RAN 120 may enable UE devices 110 to connect to core network 130 for mobile telephone service, Short Message Service (SMS) message service, Multimedia Message Service (MMS) message service, Internet access, cloud computing, and/or other types of data services. RAN 120 may include access stations 125-A to 125-N (referred to herein collectively as "access stations 125" and individually as "access station 125"). Each access station 125 may service a set of UE devices 110. For example, access station 125-A may service UE devices 110-AA to 110-AX, etc., to access station 125-N, which may service UE devices 110-NA to 110-NY. In other words, UE devices 110-AA to 110-AX may be located within the geographic area serviced by access station 125-A, and other UE devices 110 may be serviced by another access station 125.

Access station 125 may include a 5G access device (e.g., a gNodeB (gNB)) that includes one or more radio frequency (RF) transceivers (also referred to as "cells" and/or "access device sectors") facing particular directions. In some implementations, access station 125 may also include a 4G access device (e.g., an eNodeB (eNB)). Furthermore, in some implementations, access station 125 may include a mobile edge computing (MEC) system that performs cloud computing and/or network processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that does not require the establishment of an IP connection between UE device 110 and data network 140, such as, for example, Data over Non-Access Stratum (DoNAS).

In some implementations, core network 130 may include a Long Term Evolution (LTE) access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network).

Furthermore, core network 130 may include an LTE Advanced (LTE-A) access network and/or a 5G core network or other advanced network that includes functionality such as management of 5G NR access devices; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Data networks 140-A to 140-N (referred to herein collectively as "data networks 140" and individually as "data network 140") may each include a packet data network (PDN). A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, RAN 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
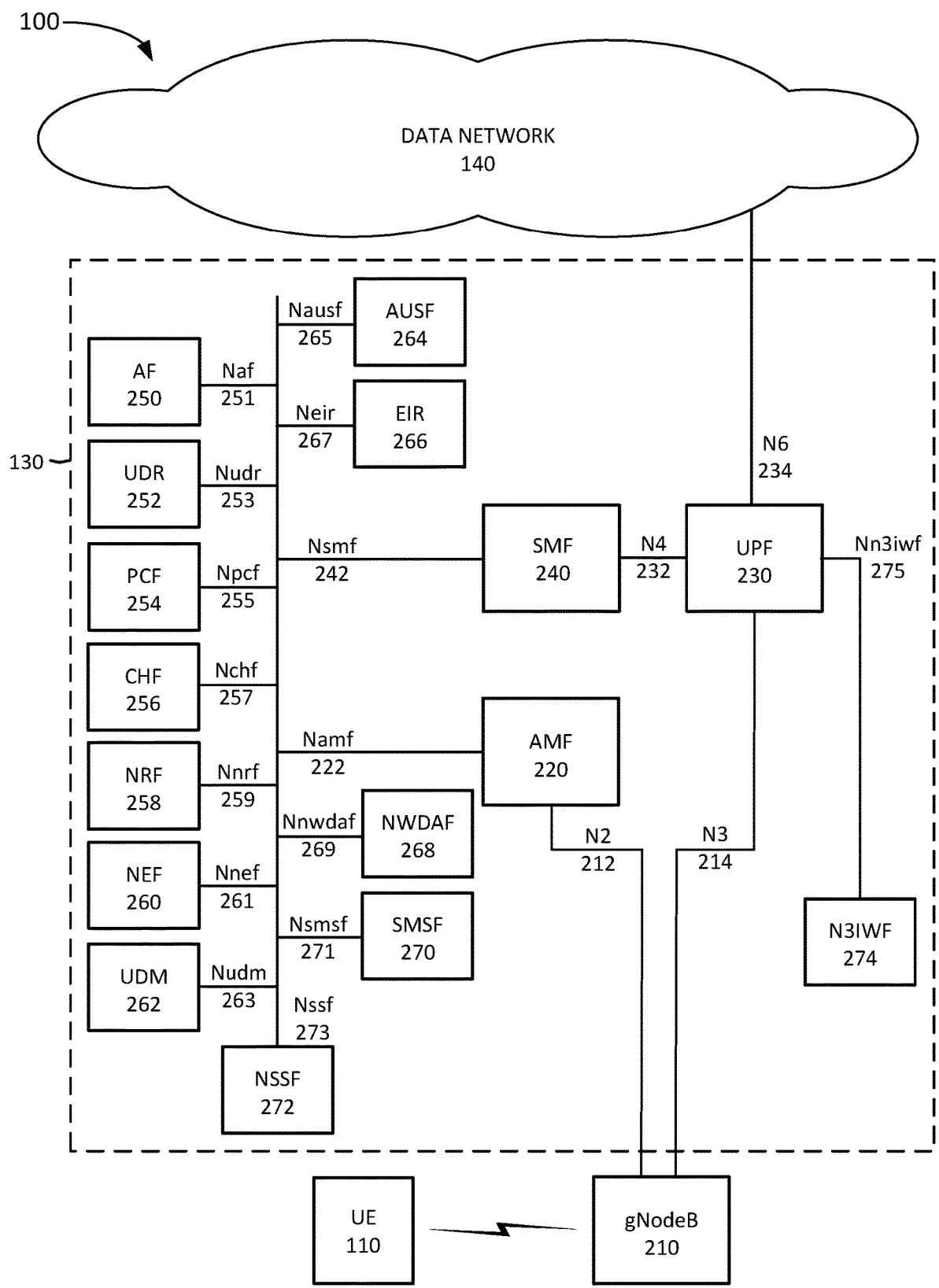
FIG. 2 is a diagram illustrating exemplary components of a portion of the environment of FIG. 1.

FIG. 2 is a diagram illustrating a portion of environment 100 that includes exemplary components of core network 130 in the context of environment 100 according to an implementation described herein. As shown in FIG. 2, the portion of environment 100 may include UE device 110, gNodeB (gNB) 210, core network 130, and data network 140.

gNB 210 (corresponding to access station 125) may include one or more devices (e.g., access devices) and other components and functionality that enable UE device 110 to wirelessly connect to RAN 120 using 5G NR RAT. For example, gNB 210 may service one or more cells, with each cell being served by a wireless transceiver with an antenna array configured for mmWave wireless communication. gNB 210 may correspond to access station 125. gNB 210 may communicate with an Access and Mobility Management Function (AMF) 220 using an N2 interface 212 and communicate with a User Plane Function (UPF) 230 using an N3 interface 214.

Core network 130 may include AMF 220, UPF 230, an SMF 240, an Application Function (AF) 250, a Unified Data Repository (UDR) 252, a Policy Control Function (PCF) 254, a Charging Function (CHF) 256, a Network Repository Function (NRF) 258, a Network Exposure Function (NEF) 260, a Unified Data Management (UDM) function 262, an Authentication Server Function (AUSF) 264, a 5G Equipment Identity Register (EIR) 266, a Network Data Analytics Function (NWDAF) 268, a Short Message Service Function (SMSF) 270, a Network Slice Selection Function (NSSF) 272, and a Non-3GPP Inter-Working Function (N3IWF) 274.

The components depicted in FIG. 2 may be implemented as dedicated hardware components or as virtualized functions implemented on top of a common shared physical infrastructure using software-defined networking (SDN). For example, an SDN controller may implement one or more of the components of FIG. 2 using an adapter implementing a virtual network function (VNF) virtual machine, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with access stations 125.

AMF 220 may be a network element that is capable of performing registration management, connection management, reachability management, mobility management, lawful intercepts, SMS transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may be a network element that is capable of maintaining an anchor point for intra/inter-RAT mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB 210), and/or perform other types of user plane processes. UPF 230 may communicate with SMF 240 using an N4 interface 232 and connect to data network 140 using an N6 interface 234.

SMF 240 may be a network element that is capable of performing session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may be a network element that is capable of providing services associated with a particular application, such as, for example, an application for influencing traffic routing, an application for accessing NEF 260, an application for interacting with a policy framework for policy control, and/or other types of applications. AF 250 may be accessible via an Naf interface 251.

UDR 252 may be a network element that is capable of providing a unified data structure that is accessible to a number of functional elements. For example, UDR 252 may support storage and retrieval of subscription data by UDM 262, storage and retrieval of policy data by PCF 254, storage and retrieval of structured data for exposure, and application data by NEF 260. UDR 252 may be accessible via an Nudr interface 253.

PCF 254 may be a network element that is capable of supporting policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may be a network element that is capable of supporting a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network KPIs associated with the NF device/instance. NRF 258 may be accessible via an Nnrf interface 259.

NEF 260 may be a network element that is capable of exposing capabilities and events to other NFs, including third party NFs, AFs, edge computing NFs, and/or other types of NFs. Furthermore, NEF 258 may secure provisioning of information from external applications to core network 130, translate information between core network 130 and devices/networks external to core network 130, support a Packet Flow Description (PFD) function, and/or perform other types of network exposure functions. NEF 260 may be accessible via an Nnef interface 261.

UDM 262 may be a network element that is capable of maintaining subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 262 may be accessible via an Nudm interface 263.

AUSF 264 may be a network element that is capable of performing authentication. For example, AUSF 264 may implement an Extensible Authentication Protocol (EAP) authentication server and may store authentication keys for UE devices 110. AUSF 264 may be accessible via an Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via an Neir interface 267.

NWDAF 268 may be a network element that is capable of collecting analytics information associated with RAN 120 and/or core network 130. For example, NWDAF 268 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may be a network element that is capable of performing SMS services for UE devices 110. SMSF 270 may be accessible via an Nsmsf interface 271. NSSF 272 includes one or more devices that select network slice instances for UE device 110. By providing network slicing, NSSF 220 allows an operator to deploy multiple substantially independent end-to-end networks potentially with the same infrastructure. In some implementations, each slice can be customized for different services. NSSF 272 maybe accessible via an Nnssf interface 273.

N3IWF 274 may be a network element that is capable of interconnecting to a non-3GPP access device, such as, for example, a WiFi access point (not shown in FIG. 2). N3IWF 274 may facilitate handovers for UE device 110 between RAN 120 and the non-3GPP access device. N3IWF 274 maybe accessible via an Nn3iwf interface 275.

Although FIG. 2 shows exemplary components of core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. For example, core network 130 may include additional function nodes not shown in FIG. 2, such as a Security Edge Protection Proxy (SEPP), an Unstructured Data Storage Network Function (UDSF), a Location Management Function (LMF), a Lawful Intercept Function (LIF), a binding session function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
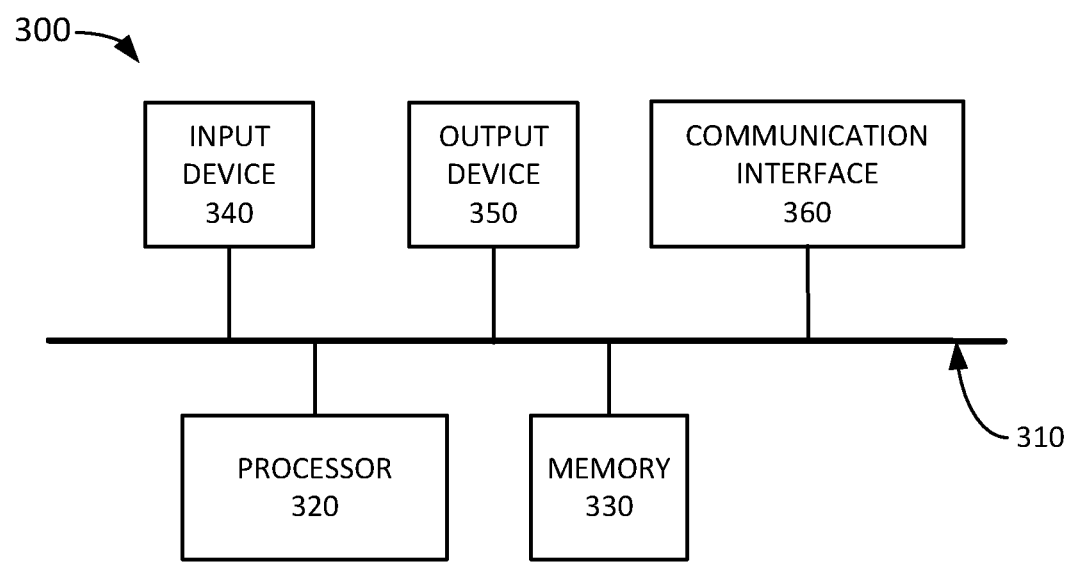
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, gNB 210, AMF 220, UPF 230, SMF 240, AF 250, UDR 252, PCF 254, CHF 256, NRF 258, NEF 260, UDM 262, AUSF 264, EIR 266, NWDAF 268, SMSF 270, NSSF 272, N3IWF 274, and/or other components of core network 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to establishing AM, UE, and SM policy control associations relating to subscription information and application-specific information. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
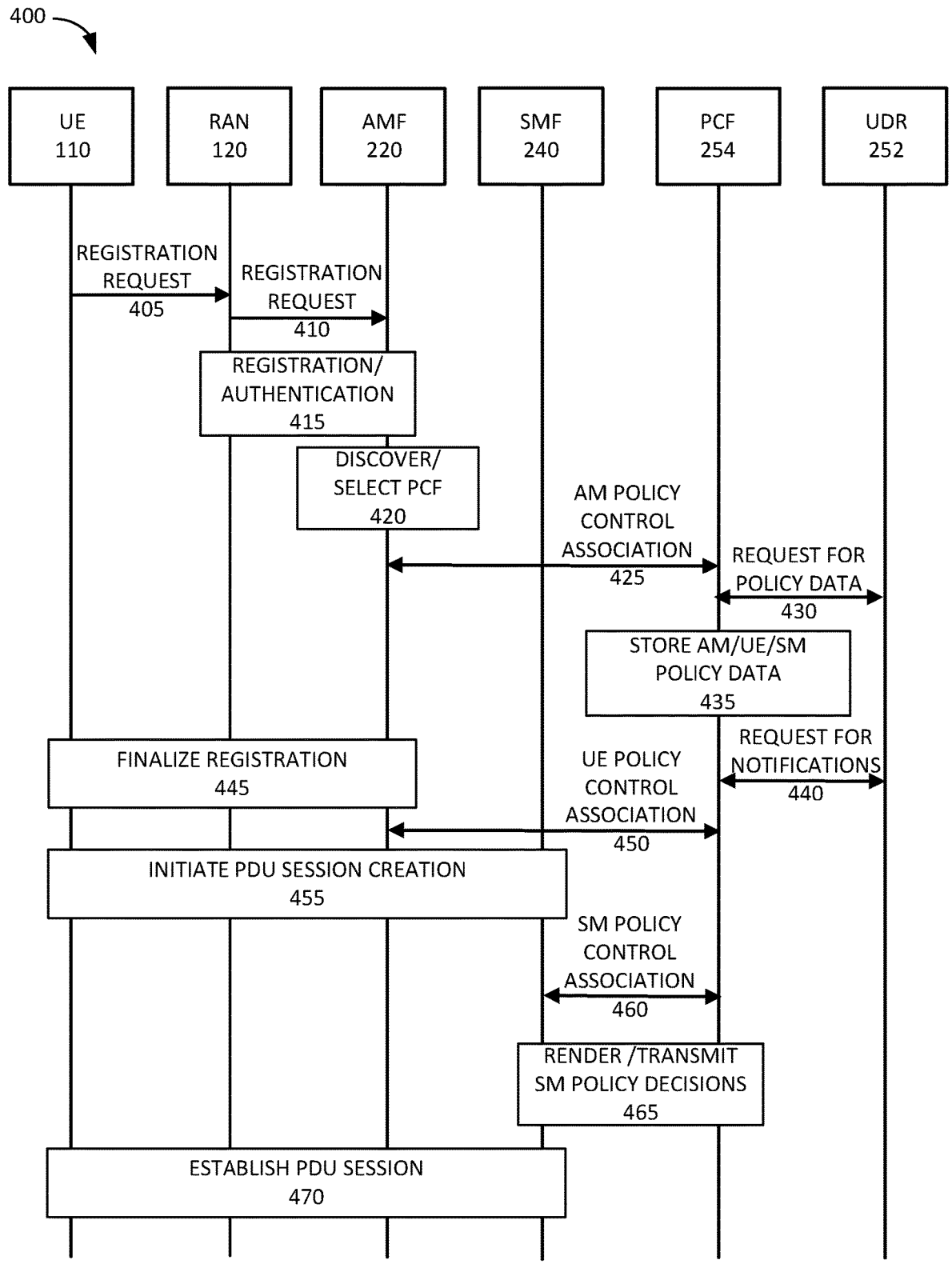
FIG. 4 is a diagram of an exemplary signal flow according to an implementation described herein.

FIG. 4 is a diagram of an exemplary signal flow 400 that depicts exemplary interactions between the components of a portion of environment 130 described above in accordance with FIG. 2. It should be understood that the signaling depicted in FIG. 4 is abbreviated to highlight concepts described herein and that, in practice, additional signals/messages beyond those shown in FIG. 4 are exchanged between NFs to provide network services.

As shown in FIG. 4, signal flow 400 may include UE device 110 (also referred to herein as UE 110) exchanging registration request signaling with RAN 120 (signal 405). For example, UE 110 may initiate Radio Resource Control (RRC) session establishment with gNB 210. In response, RAN 120 may select and register UE 110 with an appropriate AMF 220 (signal 410). For example, gNB 210 may initiate an AMF selection process. Using the selected AMF 220, RAN 120 and AMF 220 perform registration and authentication processing (block 415). For example, AMF 220 may select an appropriate AUSF 264 (not shown in FIG. 4) and may authenticate the registration request from UE 110 using the selected AUSF 264.

Following authentication, AMF 220 may discover and select PCF 254 (block 420). Using selected PCF 154, AMF 220 may initiate AM policy enforcement via Npcf interface 255. For example, AMF 220 may request creation of an AM policy control association in PCF 254 (referred to as Npcf_AMPolicyControl_Create) for identified UE 110 (signal 425). Such a request may include various UE-related and/or subscriber information, such as its subscription permanent identifier (SUPI), Internal Group identifier, subscription notification indication, Service Area Restrictions, RAT/frequency selection priority (RFSP) index, Allowed network slice selection assistance information (NSSAI), general public subscription identifier (GPSI), Access Type and RAT, permanent equipment identifier (PEI), and/or time zone.

In response to the request and according to configuration/policy design, PCF 254 may query UDR 252 for any combination of AM, UE, and SM policy data (referred to as Nudr_DataRepository_Query (AM/UE/SM Policy Data)) (signal 430). For example, the UE policy data may include various UE-related and/or subscriber information, such as UE route selection policy (URSP), network discovery and selection (e.g., wireless local area network (WLAN) selection information, non-3rd Generation Partnership Project (3GPP) interworking function (N3IWF) selection information, evolved packet data gateway (ePDG) selection information), acceptable service areas (e.g., list of allowed/non-allowed tracking area identifiers (TAIs)) and available bandwidth (e.g., radio access technology (RAT) frequency selection priority (RFSP)), and/or QoS requirements. PCF 254 may store the combination of AM, UE, and SM policy data with any available identification and/or indexing information, such as the SUPI associated with registered UE 110 (block 435). In one implementation, PCF 254 requests notifications from UDR 252 (block 440) indicating subsequent changes in subscription information for any combination of AM, UE, and SM policy data (referred to as Nudr_DataRepository_Subscribe (AM/UE/SM Policy Data)).

After retrieving and storing the requested combination of AM, UE, and SM policy data, PCF 254 transmits a decision regarding access back to AMF 220 (e.g., block 425). AMF 220 then deploys or enforces the received decision/AM policy when determining whether to register UE 110. Assuming that an affirmative policy decision is received by AMF 220 (for the purposes of FIG. 4), AMF 220, RAN 210 and UE 110 finalize registration of UE 110 onto the core network 130 (block 445) and establish the AM policy control association.

AMF 220 may initiate UE policy enforcement via Npcf interface 255. For example, AMF 220 may request creation of a UE policy control association (signal 450) in PCF 254 (referred to as Npcf_UEPolicyControl_Create). Such a request may include the various UE-related and/or subscriber information previously retrieved and stored by PCF 254, as described above. AMF 220 and PCF 254 may use the stored UE policy data to complete the establishment of the UE policy control association (e.g., signal 450).

As shown in FIG. 4, once the UE policy control association is established, creation of a PDU session is permitted to enable data to flow between UE 110 and data network 140. In block 455, PDU session creation may be initiated and include, among other operations, selection of a suitable SMF 240 by AMF 220 and selection of a suitable PCF 254 by SMF 240. As described above, current standard-based signaling does not require that AMF 220 and SMF 240 select a same PCF 254. However, consistent with existing standards, AMF 220 does provide a PCF identifier to SMF 240 during PDU session establishment. Based on various criteria, such as operator policies, SMF 240 may determine whether to use the identified PCF for session SM policy decisions. For the purposes of this description, it is assumed that SMF 240 has determined to use the identified PCF 254 for SM policy determination.

As part of its policy framework, SMF 240 is configured to create associations between the PDU session being established and any SM policies that may apply to the particular PDU session. Such associations are established by SMF 240 querying PCF 254 for applicable SM policy decisions (signal 460). Such a request, referred to as Npcf_SMPolicyControl_Create, may include various elements of information, such as: SUPI, PDU Session ID, PDU Session Type, DNN, Access Type, AMF instance identifier, UE network address, PEI, User Location Information, Time Zone, Serving Network, RAT type, Charging Characteristics, Session AMBR, default QoS information, Internal and Group Identifier.

Consistent with implementations described herein, in addition to the SM policy rules themselves, which may be stored within or otherwise available from PCF 254, and the information received from SMF 240, PCF 254 may identify the SM policies for enforcement as and may render appropriate SM policy decisions (block 465) and transmit such decisions to SMF 240 (e.g., signal 460). Based on these decisions, and the establishment of the SM policy control associations, the PDU session may (or may not) be established by SMF 240 (block 470) for UE 110 via RAN 120.

Figure 5:
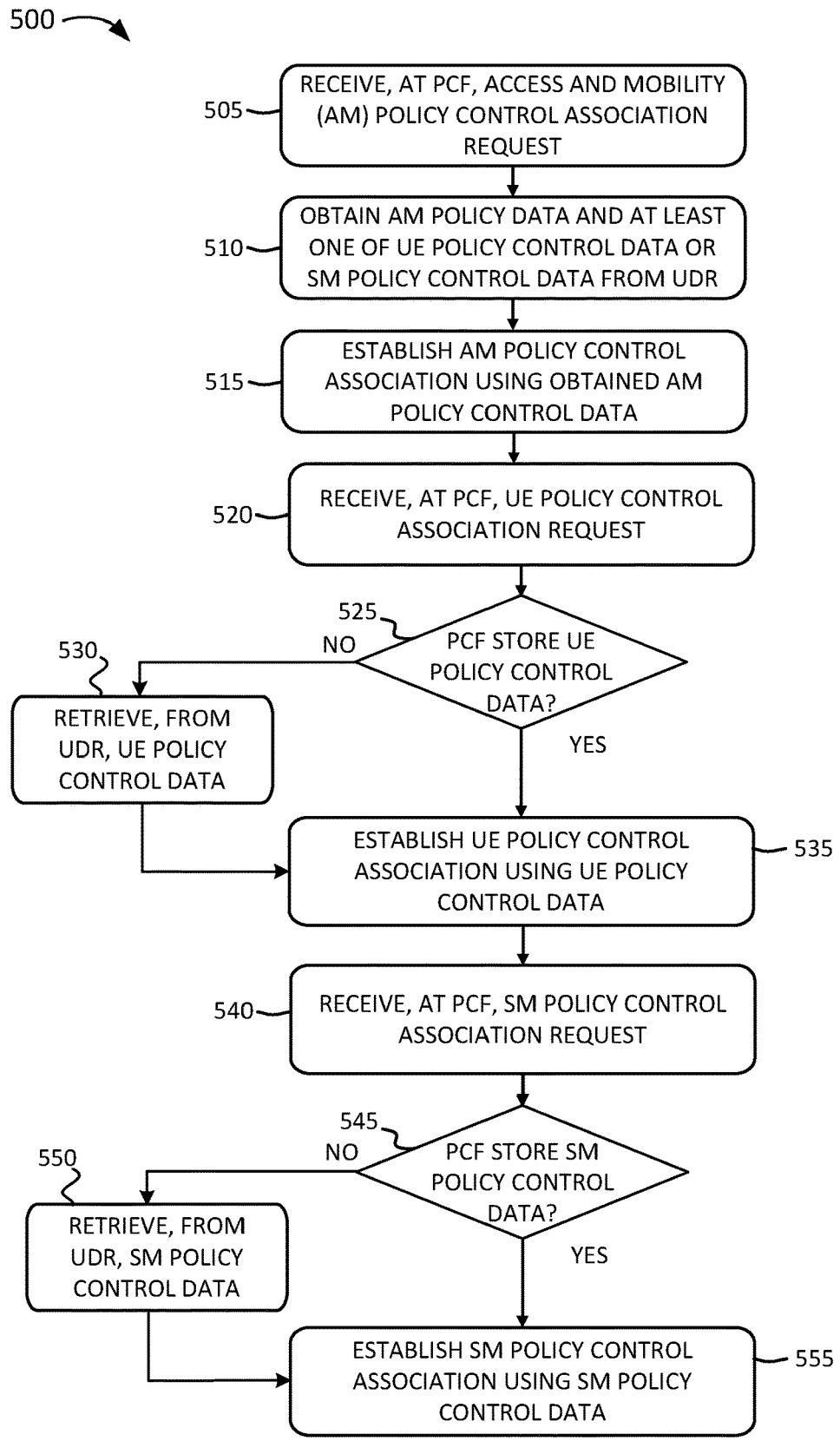
FIG. 5 is a flowchart of a process for implementing a policy control associations establishment procedure according to an implementation described herein.

FIG. 5 is a flowchart of a process 500 for establishing one or more of AM, UE, and SM policy control associations according to an implementation described herein. In some implementations, the process of FIG. 5 may be performed by PCF 254. In other implementations, some or all of process 500 may be performed by another device or a group of devices separate from PCF 254.

Process 500 may include PCF 254 receiving an AM policy control association request via Npcf interface 255 (Npcf_AM_PolicyControl_Create) from AMF 220 in relation to a registration request from a subscriber at UE 110 (block 505). For example, as described above, following receipt of a registration request by AMF 220 from UE 110 (via RAN 120), AMF 220 may discover and select PCF 254 and may initiate registration and/or authentication with RAN 120 on behalf of UE 110. The Npcf_AMPolicyControl_Create request may include various elements relating to UE 110, such as the subscriber's SUPI, the PDU session ID, the DNN, and the S-NSSAI, among other information. Upon receipt of the AM policy association request from AMF 220, PCF 254 generates e.g., using an extension to Nudr interface 253 (Nudr_DataRepository_Query (AM/UE/SM Policy Data)), a query for AM policy control data and one or both of UE policy control data and SM policy control data stored in UDR 252 (block 510). Based on the response from UDR 252, PCF 254 may store the obtained data, and forward AM policy decisions to AMF 220 and establish AM policy control association (block 515).

Process 500 may further include PCF 254 receiving a UE policy control association request via Npcf interface 255 (Npcf_UE_PolicyControl_Create) from AMF 220 in relation to the PDU session establishment request from the subscriber at UE 110 (block 520). PCF 254 may determine whether UE policy control data has already been retrieved from UDR 252 (e.g., from block 510) and is currently stored at PCF 254 (block 525). If PCF 254 determines that it does not have the UE policy control data (block 525—NO), PCF 254 may query, via Nudr interface 253 (Nudr_DataRepoistory_Query), UDR 252 for the UE policy control data (block 530). PCF 254 may establish the UE policy control association using the obtained data (block 535). Alternatively, if PCF 254 determines that, from performing block 510, it does have the UE policy control data (block 525—YES), PCF 254 may establish the UE policy control association using the stored data (block 535).

Process 500 may include receiving an SM policy association request via Npcf interface 255 (Npcf_SMPolicyControl_Create) from SMF 240 in relation to the PDU session establishment request (block 540). As part of the request, SMF 240 discovers (e.g., from NRF 258) and selects a PCF 254 and transmits the Npcf_SMPolicyControl_Create request to the selected PCF. The Npcf_SMPolicyControl_Create request may include various elements relating to UE 110 and the requested PDU session, such as the subscriber's SUPI, the PDU session ID, the DNN, and the S-NSSAI, among other information. Consistent with embodiments described herein, the SM policy association request may also include the PCF ID relating to PCF 254 selected and used by AMF 220 during UE registration, as described above.

Process 500 may further include PCF 254 receiving a SM policy control association request via Npcf interface 255 (Npcf_SM_PolicyControl_Create) from SMF 240 in relation to the PDU session establishment request from the subscriber at UE 110 (block 540). PCF 254 may determine whether SM policy control data has already been retrieved from UDR 252 (e.g., from block 510) and is currently stored at PCF 254 (block 545). If PCF 254 determines that it does not have the SM policy control data (block 545—NO), PCF 254 may query, via Nudr interface 253 (Nudr_DataRepoistory_Query), UDR 252 for the SM policy control data (block 550). PCF 254 may establish the SM policy control association using the obtained data (block 555). Alternatively, if PCF 254 determines that, from performing block 510, it does have the SM policy control data (block 545—YES), PCF 254 may establish the SM policy control association using the stored data (block 555).

Various embodiments described herein relate to AM, UE, and/or SM policy control associations establishment procedures that reduce the amount of signaling that is performed using existing standard-based signaling. In one example, a service-based network interface is modified with an extension such that any combination of AM policy control data, UE policy control data, and/or SM policy control data can be queried in fewer than three messages, for example, in two messages or in a single message. In another embodiment, a service-based network interface is modified with an extension such that any combination of AM policy control data, UE policy control data, and/or SM policy control data can be subscribed to for subsequent change notifications, in fewer than three messages, for example, in two messages or in a single message.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of messaging and operations have been described with respect to FIG. 4 and a series of blocks have been described with respect to FIG. 5 the order of the signals and/or blocks may be modified in other implementations. Further, non-dependent messaging and operations and/or blocks may be performed in parallel, were appropriate.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or an FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:
1. A method comprising:
　　receiving, at a first network device, a first request to establish an access and mobility (AM) policy control association in relation to an establishment of a packet data unit (PDU) session requested by a subscriber associated with a user equipment (UE) device, wherein the first network device is a policy control function (PCF) that is selected, among other PCFs, by a session management function (SMF) based on criteria including operator policies, to use for session management (SM) policy decisions;

generating, by the first network device, a query to a second network device via a network interface, for AM policy control data, UE policy control data, and SM policy control data;

receiving, at the first network device, the AM policy control data and one of the UE policy control data or the SM policy control data from the second network device;

creating, by the first network device, the AM policy control association based on the received AM policy control data;

storing, at the first network device, the one of the UE policy control data or the SM policy control data;

receiving, at the first network device, a second request to establish a UE policy control association and an SM policy control association, in relation to the establishment of the PDU session;

determining, at the first network device and responsive to the second request, that the one of the UE policy control data or the SM policy control data is not stored at the first network device;

generating, by the first network device, another query to the second network device for the one of the UE policy control data or the SM policy control data; and generating a third request for notification of a subsequent change to the stored UE policy control data and the SM policy control data.

2. The method of claim 1, further comprising:
creating the UE policy control association based on the stored UE policy control data.

3. The method of claim 1, further comprising:
creating the SM policy control association based on the stored SM policy control data.

4. The method of claim 1, further comprising:
receiving a notification of the subsequent change to the UE policy control data.

5. The method of claim 1, further comprising:
receiving a notification of the subsequent change to the SM policy control data.

6. The method of claim 1, wherein the PCF is deployed in a core network, the second network device comprises a unified data repository (UDR) device in the core network, and the network interface comprises an Nudr interface.

7. The method of claim 1, wherein the AM policy control data, the UE policy control data, and the SM policy control data comprise subscription information pertaining to the subscriber and application-specific information pertaining to the PDU session.

8. A first network device comprising:
a processor configured to:
receive a first request to establish an access and mobility (AM) policy control association in relation to an establishment of a packet data unit (PDU) session requested by a subscriber associated with a user equipment (UE) device, wherein the first network device is a policy control function (PCF) that is selected, among other PCFs, by a session management function (SMF) based on criteria including operator policies, to use for session management (SM) policy decisions;

generate a query to a second network device via a network interface, for AM policy control data, UE policy control data, and SM policy control data;

receive the AM policy control data and one of the UE policy control data or the SM policy control data from the second network device;

create the AM policy control association based on the received AM policy control data;

store the one of the UE policy control data or the SM policy control data;

receive a second request to establish a UE policy control association and an SM policy control association, in relation to the establishment of the PDU session;

determine, responsive to the second request, that the one of the UE policy control data or the SM policy control data is not stored at the first network device;

generate another query to the second network device for the one of the UE policy control data or the SM policy control data; and generate a third request for notification of a subsequent change to the stored UE policy control data and the SM policy control data.

9. The first network device of claim 8, wherein the processor is further configured to:
create the UE policy control association based on the stored UE policy control data.

10. The first network device of claim 8, wherein the processor is further configured to:
receive a second request to establish an SM policy control association in relation to the establishment of the PDU session; and
create the SM policy control association based on the stored SM policy control data.

11. The first network device of claim 8, wherein the processor is further configured to:
receive a notification of the subsequent change to the UE policy control data.

12. The first network device of claim 8, wherein the processor is further configured to:
receive a notification of the subsequent change to the SM policy control data.

13. The first network device of claim 8, wherein the PCF is deployed in a core network, the second network device comprises a unified data repository (UDR) device in the core network, and the network interface comprises an Nudr interface.

14. The first network device of claim 8,
wherein the AM policy control data, the UE policy control data, and the SM policy control data comprise subscription information pertaining to the subscriber and application-specific information pertaining to the PDU session.

15. A non-transitory, computer-readable storage media storing instructions executable by one or more processors of a first network device, which when executed cause the first network device to:
receive a first request to establish an access and mobility (AM) policy control association in relation to an establishment of a packet data unit (PDU) session requested by a subscriber associated with a user equipment (UE) device, wherein the first network device is a policy control function (PCF) that is selected, among other PCFs, by a session management function (SMF) based on criteria including operator policies, to use for session management (SM) policy decisions;
generate a query to a second network device via a network interface, for AM policy control data, UE policy control data, and SM policy control data;
receive the AM policy control data, the UE policy control data, and the SM policy control data from the second network device;
create the AM policy control association based on the received AM policy control data;
store the one of the UE policy control data or the SM policy control data;
receive a second request to establish a UE policy control association and an SM policy control association, in relation to the establishment of the PDU session;
determine, responsive to the second request, that the one of the UE policy control data or the SM policy control data is not stored at the first network device;
generate another query to the second network device for the other one of the UE policy control data or the SM policy control data; and
generate a third request for notification of a subsequent change to the stored UE policy control data and the SM policy control data.

16. The non-transitory, computer-readable storage media of claim 15, wherein the instructions, when executed, further cause the first network device to:
create the UE policy control association based on the stored UE policy control data;
create the SM policy control association based on the stored SM policy control data.

17. The non-transitory, computer-readable storage media of claim 15, wherein the PCF is deployed in a core network, the second network device comprises a unified data repository (UDR) device in the core network, and the network interface comprises an Nudr interface.

18. The non-transitory, computer-readable storage media of claim 15,
wherein the AM policy control data, the UE policy control data, and the SM policy control data comprise subscription information pertaining to the subscriber and application-specific information pertaining to the PDU session.

19. The non-transitory, computer-readable storage media of claim 15, wherein the instructions, when executed, further cause the first network device to:
receive a notification of the subsequent change to the UE policy control data.

20. The non-transitory, computer-readable storage media of claim 15, wherein the instructions, when executed, further cause the first network device to:
receive a notification of the subsequent change to the SM policy control data.

* * * * *